United States Patent [19]

Sahagian

[11] Patent Number: 4,549,590
[45] Date of Patent: Oct. 29, 1985

[54] RESILIENT WHEELS

[76] Inventor: Edward H. Sahagian, 67 Chester St., Arlington, Mass. 02174

[21] Appl. No.: 590,212

[22] Filed: Mar. 16, 1984

[51] Int. Cl.⁴ .............................................. B60B 9/12
[52] U.S. Cl. ...................................... 152/41; 152/49; 152/57; 295/12
[58] Field of Search ...................... 295/12; 152/30, 41, 152/49, 56-59

[56] References Cited

U.S. PATENT DOCUMENTS

| | | | |
|---|---|---|---|
| 2,770,278 | 11/1956 | Dillon | 152/41 |
| 2,850,065 | 9/1958 | Appel | 152/41 |
| 2,891,593 | 6/1959 | Deuring et al. | 152/49 |
| 2,903,036 | 9/1959 | Wolfram | 152/49 |
| 2,921,811 | 1/1960 | Trevaskis | 295/12 |
| 3,090,415 | 5/1963 | Sahagian | 152/41 |

FOREIGN PATENT DOCUMENTS

| | | | |
|---|---|---|---|
| 167958 | 8/1921 | United Kingdom | 301/41 |
| 371784 | 4/1932 | United Kingdom | 295/12 |

Primary Examiner—David A. Scherbel
Attorney, Agent, or Firm—Hamilton, Brook, Smith & Reynolds

[57] ABSTRACT

A resilient wheel having tire rim, a central hub portion, a shock absorbing member between the rim and the hub comprising an annular pneumatically sealed, hollow, substantially toroidal member, at least a portion of which is flexible, both the rim and the hub being attached to the toroidal member, one of which is attached to the flexible portion whereby shocks imparted to the rim are absorbed by the flexible portion and air within the toroidal member.

4 Claims, 4 Drawing Figures ical Field

This invention relates to resilient wheels of the type in which an annular resilient shock absorbing element isolates the rim on which the tire is mounted from the central part or hub of the wheel which attaches to the brake drum. The shock absorbing element serves as an absorber of bumps and vibrations imparted to the tire and rim, as for example, from running over an obstacle or into a depression in a road surface.

2. Background of the Invention

In spite of the enormous advance attained by the modern pneumatic tire in absorbing and suppressing road shocks, a very substantial amount of shock and vibration still is passed on by the tire to the standard metallic rim. The rim being fixed to or integral with the wheel and/or the metallic hub fixed therein, passes on shocks through the springs to the body. Lower tire pressures and softer springing have reduced the amount of shock and vibration thus transmitted, but these resorts bring other well known drawbacks in their turn, e.g., reduced handling precision.

An example of prior art resilient wheels includes U.S. Pat. No. 2,891,593 to Deuring et al. It discloses a wheel having two rubber shock absorbing rings vulcanized to a divided rim, one ring to a supporting disc attached to the main wheel disc or hub, the other to an annular flange secured to the disc and diverging from the supporter ring. U.S. Pat. No. 2,903,036 to Walfram also discloses two rubber rings secured to annular rings bolted to bosses on the wheel hub and secured to the outer tire rim.

In both of these patents the rubber shock absorbing rings are exposed directly to ambient air pressure on both their sides relying completely on their own resilience to absorb shocks.

In my prior U.S. Pat. No. 3,090,415, I disclosed a pneumatic tired vehicle wheel in which the rim was separated from the hub by a single band of rubber or other elastomeric material which isolated the hub from shock imparted to the tire and rim. In accordance with the invention, the rim was separated from all metallic contact with the wheel and/or hub of the vehicle by suspending the wheel within the rim in a continuous band of elastomeric material bonded to the rim along its lateral margins. The elastomeric material was also bonded to extensions or "spokes" on the wheel in alignment with apertures provided in the otherwise continuous felloe of the rim. The elastomeric material was subjected at such apertures to the air pressure within the tires, directly in the case of tubeless tires and through the intervening tube when such is used, so that the elastomeric material was stressed when the tire was inflated, imparting stability to the assembly.

An obvious disadvantage to my prior construction was that any leak in the seal between the elastomeric material and the rim or the spokes caused deflation of the tire per se if it were tubeless.

DISCLOSURE OF THE INVENTION

The invention resides in a resilient wheel having a tire rim of the type which normally accepts a tubeless or tube type tire and a central hub portion for attachment to the brake drum or central wheel portion of a vehicle. A shock absorbing element isolates the rim from the hub and comprises an annular, pneumatically sealed, hollow, substantially toroidal member at least a portion of which is flexible. Both the rim and the hub are attached to the toroidal member, one of which is attached to the flexible portion. Air is contained within the toroidal member and it, in combination with the flexible portion, receives shocks imparted to the rim and effectively isolates shock from the hub portion which is attached to the vehicle.

Alternatively, either the rim or the central hub portion may be attached to the flexible portion of the shock absorbing element.

The shock absorbing element is in the form of a circular channel with the normally open face of the channel receiving a circular elastomeric segment which is bonded to the channel and which seals air within it, effectively making the shock absorbing element toroidal. The flexible segment may be made of one or two pieces and depending on the orientation of the channel is attached either to the rim or the central hub.

Means are provided for selectively pressurizing the air within the shock absorber so that the pressurized air not only stabilized the assembly but in combination with the flexible segment of the shock absorber, acts to cushion shocks imparted to the rim.

As another feature of the invention, an annular metallic ring may be employed on the air-facing side of the elastomeric material to additionally reinforce it.

The above and other features of the invention including various novel details of construction and combinations of parts will now be more particularly described with reference to the accompanying drawings and pointed out in the claims. It will be understood that the particular resilient wheel embodying the invention is shown by way of illustration only and not as a limitation of the invention. The principles and features of this invention may be employed in varied and numerous embodiments without departing from the scope of the invention.

BEST MODE OF CARRYING OUT THE INVENTION

Figure 1:
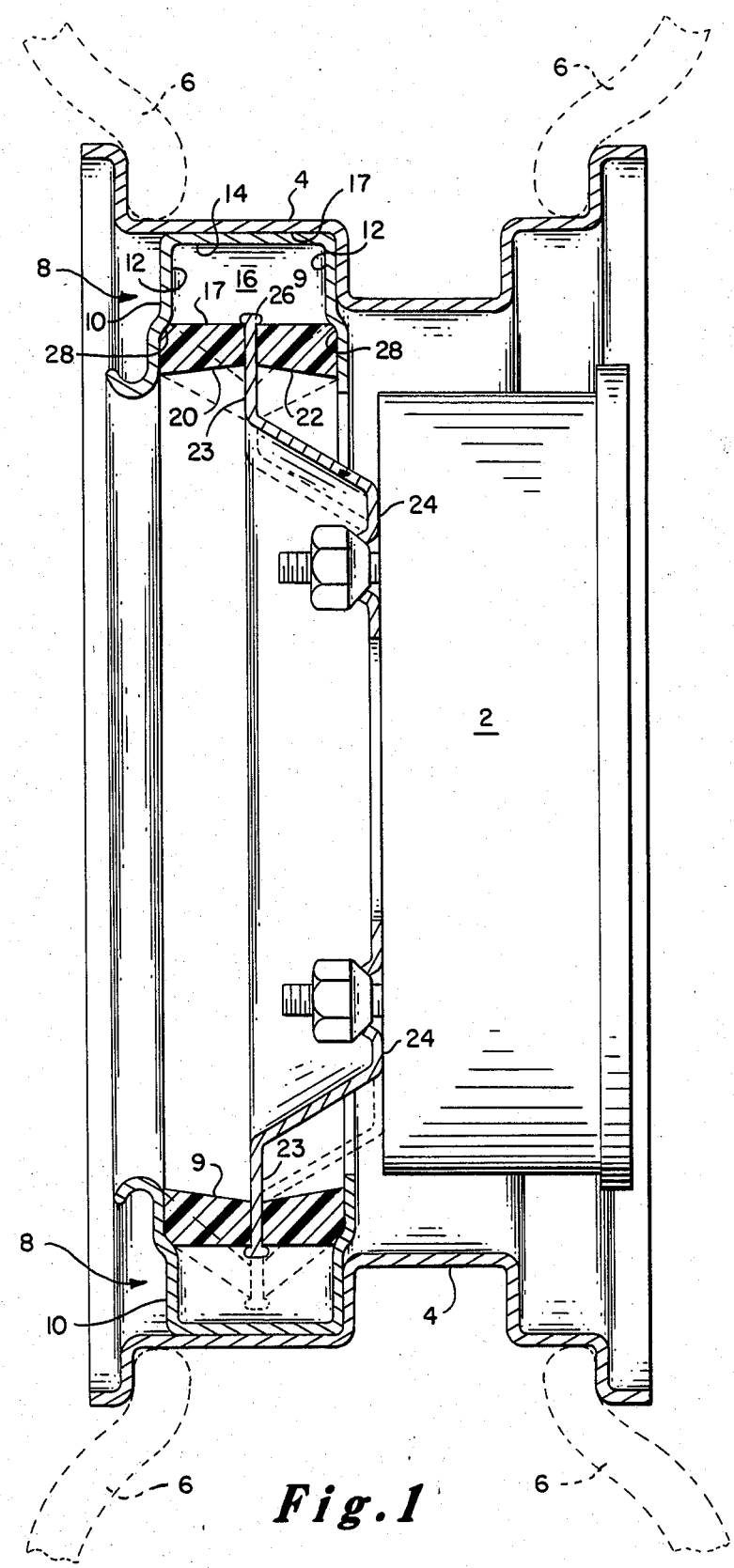
FIG. 1 is a sectional view of a portion of a wheel in which the annular housing element of the shock absorber is attached to the tire rim and the elastomeric element is attached to the central or hub portion of the wheel.

In FIG. 1 of the drawings 2 indicates a wheel body including the brake drum and 4 indicates the tire rim on which the bead portion of the tire 6 is mounted.

The shock absorbing member 8 is a substantially toroidal member although its cross section is not necessarily circular. It includes annular member 9 made of resilient elastomeric material, such as rubber, butyl or the like. The elastomeric element 9 is mounted in an annular housing or channel 10, preferably made of metal and disclosed in FIG. 1 as substantially U-shaped in cross section, although it may have other configurations, as for example, semi-circular or V-shaped, etc. The channel 10 has two side portions 12 connected by a bridge portion 14. The shock absorbing element 9 is situated between the two side portions 12 of the housing or annular channel 10 near the open annular side thereof. It is secured firmly to said side portions 12 by vulcanizing or by any other means such that the elastomeric element becomes integrally united to the channel 10, thus creating a circular pneumatically sealed air chamber 16 exposed to one face 17 of the elastomeric element 9 and to the inner faces of side portions 12 and the bridge 14 of the chan- nel.

The housing 10 is of a size to fit within the portion 1 of the tire rim as shown in FIG. 1. The bridge portion 14 is welded or otherwise rigidly connected to the tire rim 4. Thus, there is no communication between the housing 10, or the elastomeric element 9 or any part thereof with the air or tube within the tire 6.

The elastomeric element 8 may be made in two parts 20 and 22 bonded for example by vulcanization to the opposite sides of a radial section 23 of the hub 24. If desired, the peripheral edge of the radial section 23 which is located outside of the elastomeric element 9 may be widened as shown in FIG. 1 at 26 so that the edges overlap slightly the outer face of the elastomeric element 9. Each of the side portions 12 of the housing 4 may be provided with a shoulder portion 28 against which the outer corners of the elastomeric element 9 rests.

Figure 2:
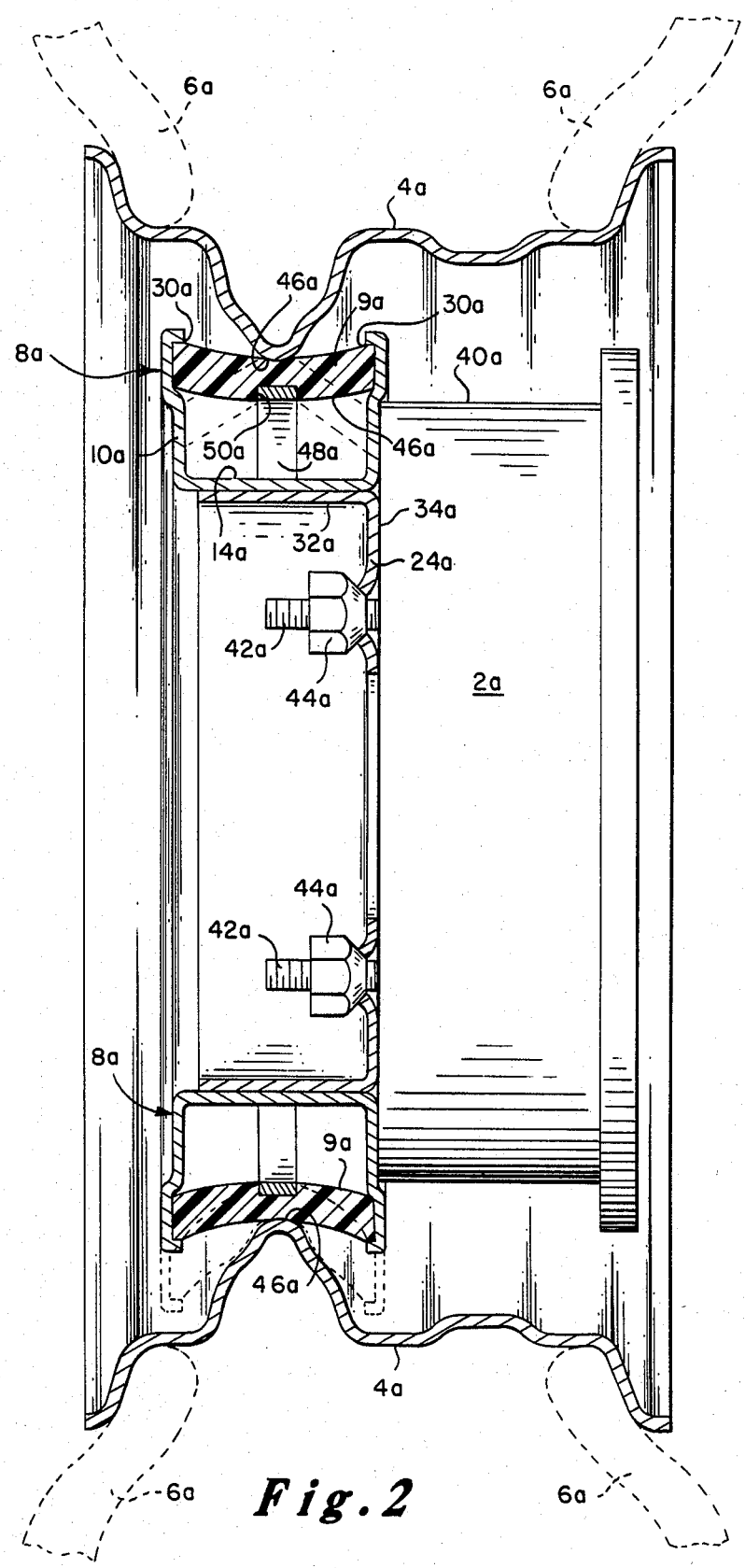
FIG. 2 is a sectional view similar to FIG. 1 showing an embodiment of the invention in which the annular housing element of the shock absorber is attached to the hub portion of the wheel while the elastomeric member is attached directly to the tire rim.

FIG. 2 discloses an embodiment of the invention in which the annular channel or housing 10a of the shock absorber 8a is rigidly secured as by welding to the central body portion or hub 24a of the wheel and a one piece elastomeric element 8a is secured to the rim 4a. The corners 30a of the annular channel or housing 10a are bent inwardly to assist in retaining the elastomeric element in place. The bridge portion 14a of the housing 10a encircles a cylindrical portion 32a extending from a circular plate 34a which together forms the central body or hub 40a. The hub is rigidly secured to the brake drum 30a of the wheel by means of threaded studs 42a and nuts 44a. The FIG. 1 hub is similarly secured to the brake drum.

The rim 4a of the wheel shown in the FIG. 2 embodiment is provided with an annular depressed portion 46a which engages the central part of the outer face of the shock absorbing element 9a and is bonded thereto by vulcanization or in any other suitable way.

The elastomeric element 9 is reinforced by a steel ring 48a which is located on its inner face and is preferably set into a recess 50a with which the elastomeric element member is provided. If desired, the ring 48a may be bonded to the elastomeric element 9a by vulcanization.

The tire rim 4a to which the elastomeric element 9a is bonded is shown in solid line in FIG. 2 in normal operating position. When the wheel rim 4a has an upward movement due, for example, to unevenness in the road bed, the two sides of the elastomeric element 9a will be bent downwardly around the part 46a of the lower portion of the rim 4a as shown in dotted lines at the bottom of FIG. 2 and will thus be partially supported thereby. The diametrically opposite side of the elastomeric member 9a will also flex downwardly but away from the part 46a of the rim 4a. With each flexure the air within the channel is compressed to aid in the shock absorbing process.

An advantage of this embodiment is that as the upward movement of the wheel rim 4a relative to the body portion 24a of the wheel increases, the resistance which the shock absorbing element presents to the upward movement of the wheel rim also increases.

With either construction, vibrating movement of the tire rim due to unevenness in the surface over which the wheel is traveling will permit a movement of the tire rim relative to the wheel body with the elastomeric shock absorbing element moving from the solid to the dotted line positions shown in both FIGS. 1 and 2. During movement, the air contained within the housing is continuously compressed and expanded, greatly aiding in the shock absorbing process while at the same time the housing and the elastomeric shock absorbing element remains completely isolated from the tube or air within the tire.

The air in the annular channel or housing 10 or 10a, as the case may be, is at atmospheric pressure when the wheel is assembled. However, it is at times desirable to selectively increase the pressure to assist the elastomeric member 9 or 9a in its function of absorbing shock. By increasing the pressure within the channel above atmospheric the flexure tendency of the elastomeric member is stiffened. Normally the pressure would not be increased to exceed the pressure within the tire per se although it is possible to do so.

Figure 3:
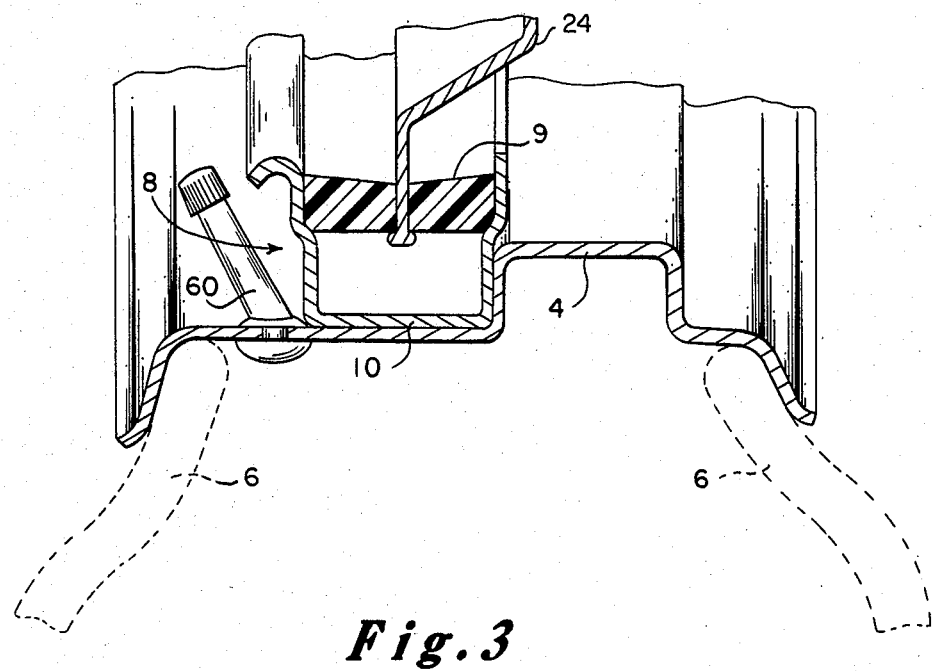
FIG. 3 is a partial sectional view of a wheel with means for selectively pressurizing the tire.
Figure 4:
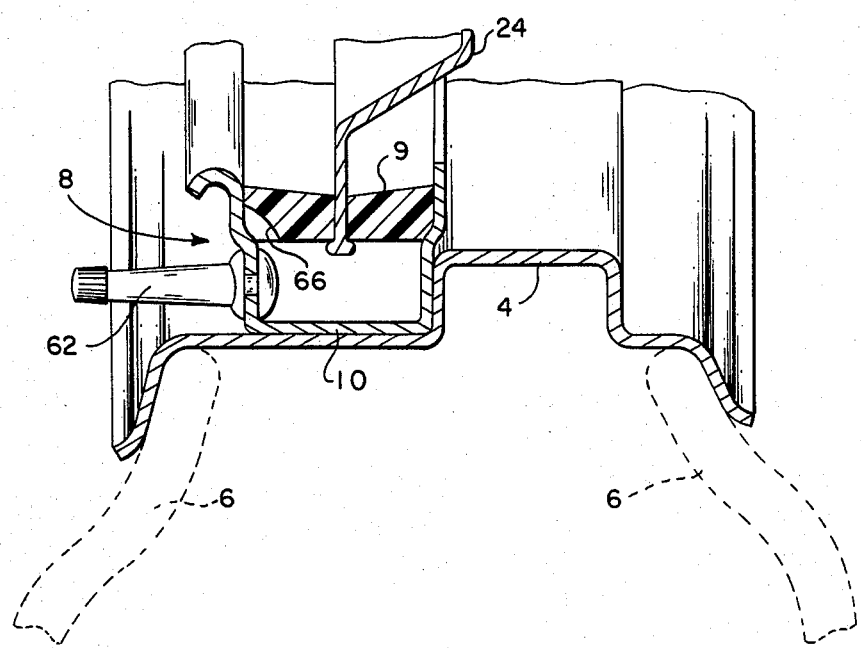
FIG. 4 is a partial sectional view of a wheel with means for selectively pressurizing the shock absorbing element.

FIGS. 3 and 4 disclose valve means for pressurizing the tire 6 and the annular chamber 10. The tire pressurizing stem valve 60 is a conventional stem valve inserted and pneumatically sealed in the rim 4 (FIG. 3). As seen in FIG. 4 a similar pressurizing stem valve 62 is inserted into and pneumatically sealed in the channel 10 to pressurize the shock absorbing element 8. The valve 62 may enter the channel 10 directly as seen in FIG. 4 or in any convenient manner depending on the particular configuration of the channel 10. The valve may also of necessity have a curved stem (not shown) to facilitate its entry into the chamber while clearing the rim 4 and tire 6. In the event of possible interference between the elastomeric element 9 and the shock absorber valve stem 62 when the elastomeric element flexes, the elastomeric element may be relieved or cut away as at 66 to provide clearance. The tire pressurizing valve 60 and the shock absorbing pressurizing valve 62 will be located circumferentially 180° degrees from each other to maintain wheel balance.

What I claim is:

1. A resilient wheel having:
   a tire rim,
   a cylindrical, cup-shaped hub,
   an annular channel of substantially U-shaped cross-section secured to the exterior circumference of the cup-shaped hub with the circumferential opening of the channel facing radially outward of the hub,
   a one-piece, annular, elastomeric member fitted in the circumferential opening of the channel creating a shock absorbing sealed air space defined by the inner surface of the elastomeric member and the interior surfaces of the U-shaped channel,
   the tire rim being attached only to the exterior surface of the elastomeric element whereby shocks imparted to the rim are absorbed by the elastomeric member and the air sealed within the channel.

2. A resilient wheel according to claim 1 wherein the corners of the annular channel are bent inwardly to assist in retaining the elastomeric element in the channel.

3. A resilient wheel according to claim 1 wherein valve means are located in the channel for selectively pressurizing the air within the shock absorbing sealed air space.

4. A resilient wheel according to claim 1 wherein the elastomeric element has an annular reinforcing member in the form of a hoop on its inner surface facing the shock absorbing sealed air space.

* * * * *